US010040041B2

(12) United States Patent
Wright et al.

(10) Patent No.: US 10,040,041 B2
(45) Date of Patent: Aug. 7, 2018

(54) CRUDE OIL BLENDING USING TOTAL BOILING POINT ANALYSIS

(71) Applicant: Cameron International Corporation, Houston, TX (US)

(72) Inventors: Stuart F. Wright, Battle East (GB); Jonathan Moreau, Maidstone (GB)

(73) Assignee: Cameron International Corporation, Houston, TX (US)

( * ) Notice: Subject to any disclaimer, the term of this patent is extended or adjusted under 35 U.S.C. 154(b) by 252 days.

(21) Appl. No.: 14/795,673

(22) Filed: Jul. 9, 2015

(65) Prior Publication Data

US 2017/0007974 A1    Jan. 12, 2017

(51) Int. Cl.
     *B01F 15/00*      (2006.01)
     *B01F 3/08*      (2006.01)

(52) U.S. Cl.
     CPC ...... *B01F 15/00311* (2013.01); *B01F 3/0807* (2013.01); *B01F 15/00136* (2013.01); *B01F 15/00259* (2013.01); *B01F 2215/0067* (2013.01)

(58) Field of Classification Search
     CPC .......... B01F 15/00311; B01F 15/00136; B01F 3/0807; B01F 15/00259; B01F 2215/0067
     See application file for complete search history.

(56) References Cited

U.S. PATENT DOCUMENTS

| | | |
|---|---|---|
| 3,996,786 A | 12/1976 | Mead et al. |
| 4,307,620 A | 12/1981 | Jiskoot |
| 4,488,570 A | 12/1984 | Jiskoot |
| 5,476,115 A * | 12/1995 | Lalumandier ........... B01F 3/026 137/101.19 |
| 6,258,987 B1 † | 7/2001 | Schmidt |
| 6,540,797 B1 † | 4/2003 | Scott |
| 7,540,887 B1 * | 6/2009 | Turocy ..................... C10L 1/10 44/448 |
| 8,506,656 B1 † | 8/2013 | Turocy |

(Continued)

FOREIGN PATENT DOCUMENTS

WO      2001070912 A1    9/2001

OTHER PUBLICATIONS

"JISKOOT(TM) Quality Systems: JetMix(R)," Brochure, two pages, published by Cameron International Corporation, Houston, Texas, dated 2011.

(Continued)

*Primary Examiner* — Randy Boyer
*Assistant Examiner* — Juan C Valencia
(74) *Attorney, Agent, or Firm* — Eubanks PLLC

(57) ABSTRACT

A technique for combining crude oils into a blended crude oil according to a target total boiling point for the blended crude oil is provided. In one embodiment, a method includes pumping individual crude oil streams into a blending system and mixing the individual crude oil streams into a crude oil blend in the blending system according to a blend recipe. The method also includes adjusting the blend recipe during mixing of the individual crude oil streams according to a target total boiling point curve for the crude oil blend, and continuing to mix the individual crude oil streams into the crude oil blend in the blending system according to the adjusted blend recipe. Additional systems, devices, and methods are also disclosed.

16 Claims, 6 Drawing Sheets

(56) References Cited

U.S. PATENT DOCUMENTS

2004/0106204 A1  6/2004  Chimenti et al.
2013/0185044 A1  7/2013  Chen et al.

OTHER PUBLICATIONS

"JISKOOT Crude Oil Blending," Brochure, six pages, published by Cameron International Corporation, Houston, Texas, dated 2013.
Shahnovsky et al., "Advanced solutions for efficient crude blending," Petroleum Technology Quarterly Magazine, 2014 (Q2), seven pages.
Honeywell International Inc., "Closing the Loop on Blend Planning and Execution," Feb. 2014, ten pages.

* cited by examiner
† cited by third party

CRUDE OIL BLENDING USING TOTAL BOILING POINT ANALYSIS

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies often invest significant amounts of time and money in finding and extracting oil, natural gas, and other subterranean resources from the earth. Particularly, once desired subterranean resources such as oil or natural gas are discovered, drilling and production systems are often used to access and extract the resources. These systems may be located onshore or offshore depending on the locations of the desired resources.

Once extracted, the resources are often transported to desired locations, such as refineries. Crude oils, for example, are typically processed and separated into various components at an oil refinery. The components can be separated by their boiling points via fractional distillation. In this process, crude oil is heated until most of the oil is vaporized. The hot vapors are then injected into a distilling column, where the vapors cool as they rise through the column. The distilling column includes bubble trays at various levels. The rising vapors cool as they pass through the trays and the different components condense into liquid in different trays according to their boiling points, with liquids having higher boiling points nearer the bottom of the distilling column and liquids having lower boiling points nearer the top. These condensed and separated liquids, which are also known as "cuts," can be drawn from the distilling column for further processing and distribution. By way of example, in order of higher to lower boiling points, the separated liquids can include heavy gas oil, light gas oil, kerosene, naphtha, and straight run gasoline. Heavier liquids may be withdrawn from the bottom of the distilling column, and lighter gases that pass through all of the bubble trays without condensing (e.g., butane and propane) can be withdrawn from the top of the column.

Commercial demand varies for the different crude oil components, and oil refineries may target a particular yield (i.e., the percentages of the components produced from the separated crude oil) to efficiently meet demand for the components. The product yield depends on the characteristics of the crude oils processed, but also on current capabilities and characteristics of the refinery itself. To produce a desired yield and meet market demand, refineries may use a linear programming (LP) model for their specific reactors to target the purchase of crude oil feedstocks with particular characteristics for blending to a recipe determined by the LP model. Crude oil assays can indicate certain characteristics of potential feedstocks for the refinery, and a blend recipe can be determined using these crude oil assays. But the crude oil feedstocks may not be homogenous and their properties may vary. Consequently, the crude oil feedstocks actually purchased and used in the refineries may not be accurately represented by their assays. This, in turn, can negatively impact the yield of the refineries' products.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present disclosure generally relate to crude oil blending. In certain embodiments, individual crude oils are blended together according to a target total boiling point curve for the crude oil blend. The individual crude oils can be analyzed during blending, and the blend recipe can be dynamically optimized during blending based on the analysis and the target total boiling point curve for the crude oil blend. In at least one embodiment, a blending process includes a feed-forward control loop in which total boiling point curves for the individual crude oils are determined during the blending process and then used to vary the blend recipe of the individual crude oils as they are added into the blended crude oil.

Various refinements of the features noted above may exist in relation to various aspects of the present embodiments. Further features may also be incorporated in these various aspects. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Figure 1:
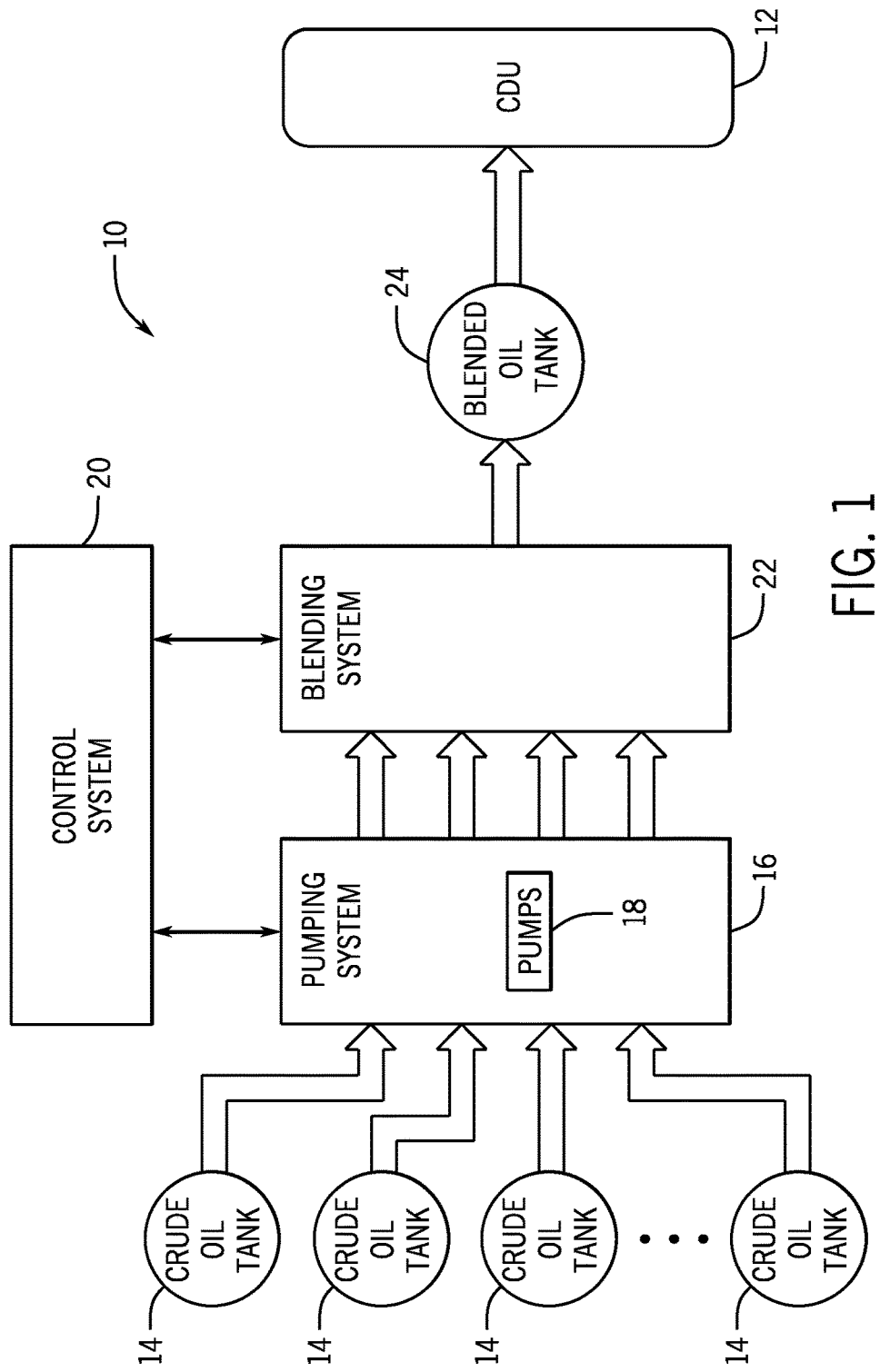
FIG. 1 is a block diagram representing components of an apparatus including a blending system for blending crude oil feedstocks in accordance with certain embodiments of the present disclosure.

Turning now to the drawings, an apparatus 10 for blending crude oils is generally illustrated in FIG. 1 by way of example. The blending apparatus 10 can be used at a refinery and is shown here with a crude oil distillation unit (CDU) 12. But it will be appreciated that the blending apparatus 10 may be used in other contexts as well, such as at oil terminals or other facilities. The depicted apparatus 10 includes tanks 14 having crude oil feedstocks and a pumping system 16 with pumps 18 for pumping the crude oil feedstocks into a blending system 22. Flow of crude oils through the apparatus 10 is generally represented by wide horizontal arrows in the present figures.

A control system 20 of the apparatus 10 controls the pumping, flow, and blending of the crude oil feedstocks into a blended crude oil, which can be stored in an oil tank 24. The control system 20 can be provided as a single controller or as a distributed system with multiple controllers, such as one controller for the pumping system 16 and a different controller for the blending system 22. The blended crude oil can be pumped from the tank 24 into the crude oil distillation unit 12 for separation or stored in the tank 24 for future transport to a remote facility.

In at least some embodiments, and as described in greater detail below, the control system 20 controls a process of blending different crude oil feedstocks from the tanks 14 into a blended crude oil according to a target total boiling point curve for the blended crude oil. This facilitates optimization of both cost and quality of the feedstocks purchased for blending. For instance, one or more lower-grade crude oils can be mixed with a higher-grade, higher-price crude oil to produce a blended crude oil having a desired total boiling point curve while using the minimum possible amount of the higher-priced crude oil. In some embodiments, the apparatus 10 determines the total boiling point curves for the crude oil feedstocks as they are fed into the blending system 22 and uses feed-forward control to dynamically adjust the blend recipe and control the input ratios of the feedstocks into the blending system 22 in real time.

Figure 2:
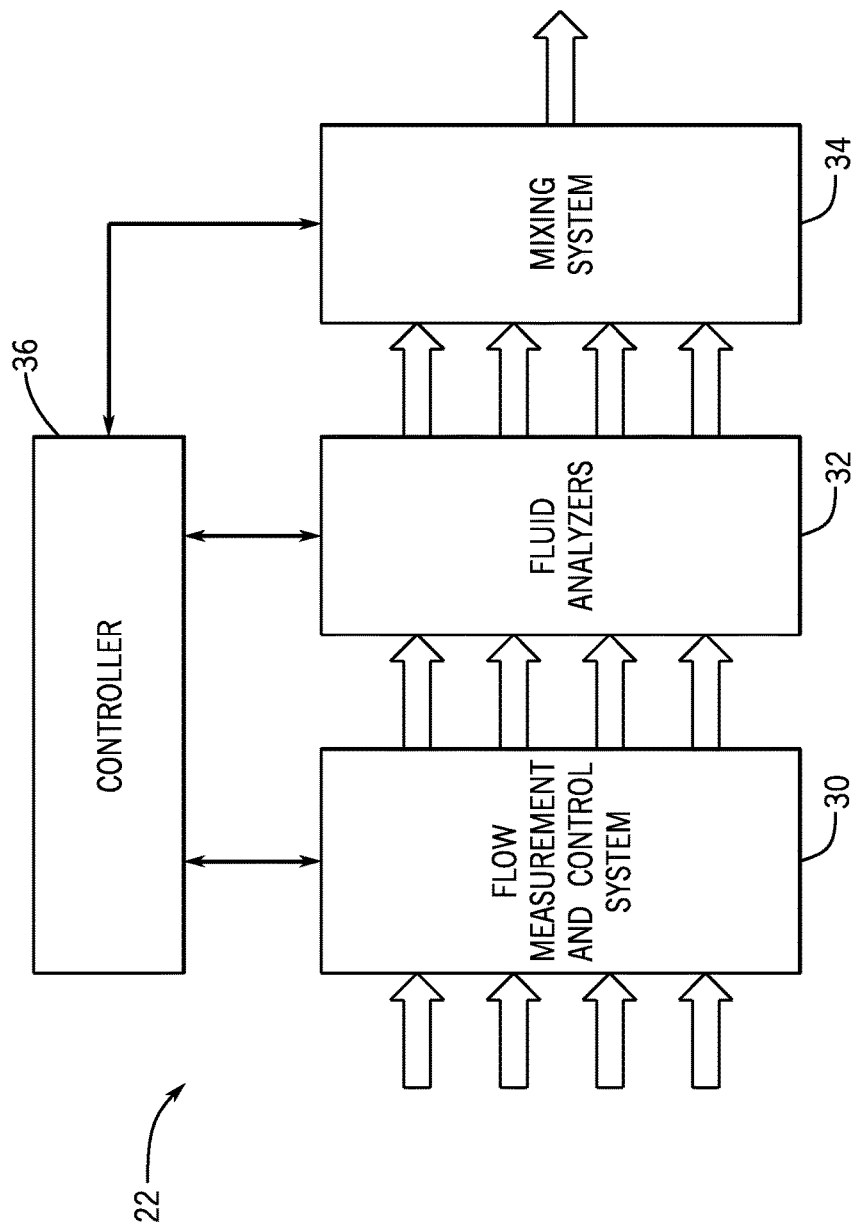
FIG. 2 is a block diagram representing components of the blending system of FIG. 1, including a flow measurement and control system, fluid analyzers, a mixing system, and a controller, in accordance with one embodiment.

Additional details of a blending system 22 in accordance with certain embodiments are generally provided in FIG. 2. This blending system 22 includes a flow measurement and control system 30 that controls and measures flow rates of the crude oil feedstocks from the tanks 14, through fluid analyzers 32, and into a suitable mixing system 34. One or more controllers 36 can be used to control operation of and receive data from, the system 30, the fluid analyzers 32, and the mixing system 34.

Figure 3:
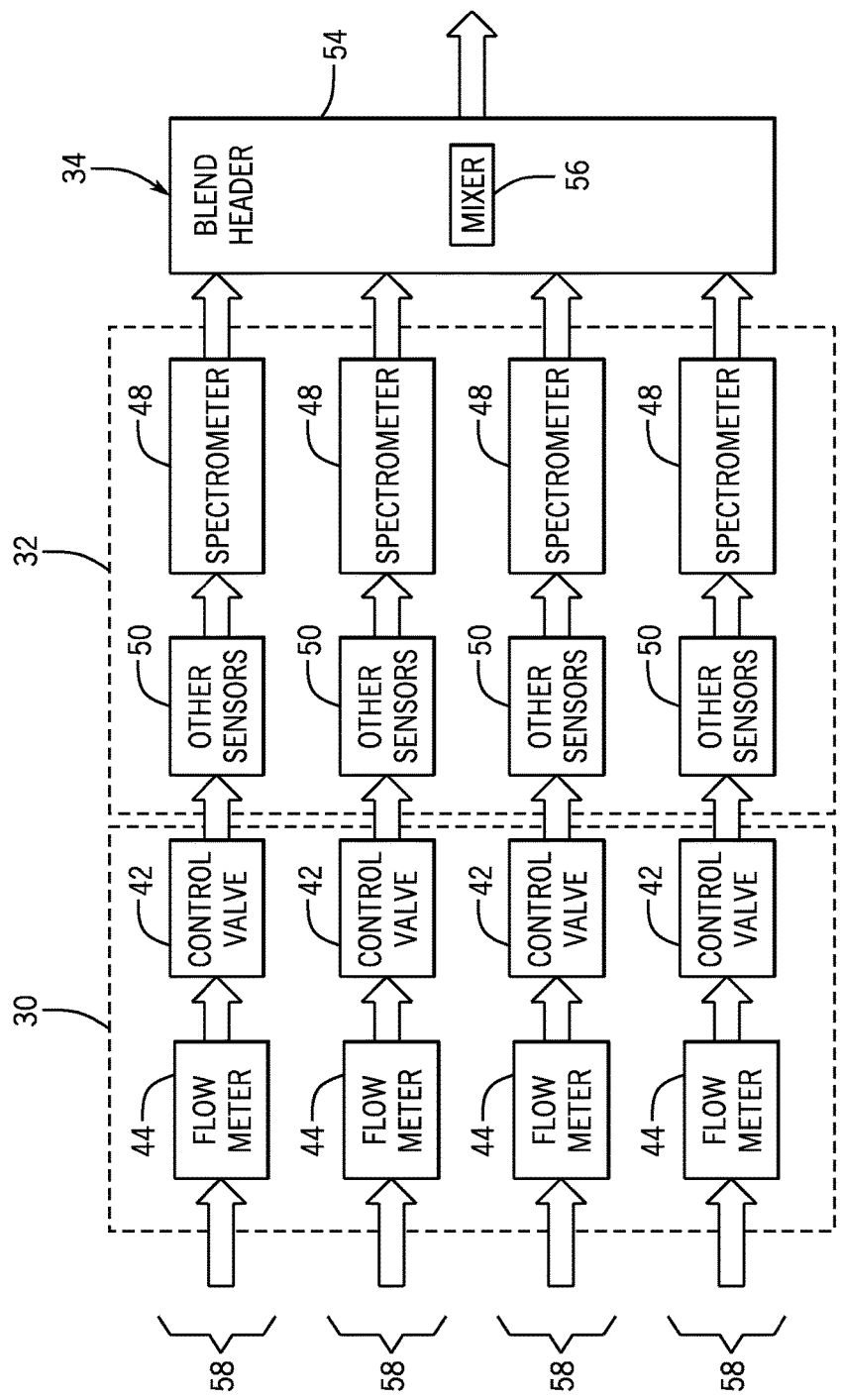
FIG. 3 is a block diagram showing additional details of the components of FIG. 2, including control valves, flow meters, and various sensors through which individual crude oil feedstock streams may be routed into a blend header of the mixing system, in accordance with one embodiment.

The flow measurement and control system 30, the fluid analyzers 32, and the mixing system 34 can include a variety of devices, certain examples of which are illustrated in FIG. 3. For instance, the depicted flow measurement and control system 30 includes control valves 42, which can be operated to control the flow of individual crude oil feedstocks from the tanks 14 to the mixing system 34, and flow meters 44 for measuring the flow rate of the individual crude oil feedstocks to the mixing system 34. The control valves 42 can be operated by the controller 36 to control flow rates of the individual crude oil feedstocks (through input fluid lines 58) according to a blend recipe and in conjunction with the flow meters 44, which indicate the flow rates of the feedstock streams to the controller 36. The flow meters 44 may be provided as ultrasonic flow meters or in any other suitable form. In at least some embodiments, variable-speed pumps 18 can also or instead be used to control flow rates of the individual crude oil feedstocks according to the blend recipe.

Although not shown in FIG. 3, the system 30 can include other components as well. Non-limiting examples of such other components include gate valves that can be opened or closed to control which crude oil feedstocks flow into the mixing system 34 (in which case the control valves 42 or pumps 18 can still be used to control the flow rate after the gate valves are opened) and check valves to prevent backflow of the crude oil feedstocks toward the tanks 14. Further, while flow through each of the input fluid lines 58 is controlled in some embodiments, the flow of individual crude oil feedstocks may be controlled in fewer than all of the input fluid lines 58 in other embodiments. For instance, in some embodiments flow through one of the fluid lines 58 is uncontrolled and flow through the remaining fluid lines 58 is controlled and adjusted to produce a blended crude oil according to the blend recipe.

The fluid analyzers 32 can be used to measure properties of crude oils in the apparatus 10 and are shown in FIG. 3 to include spectrometers 48 and other sensors 50. The spectrometers 48 can be operated to measure optical spectra of the crude oil feedstocks fed into the mixing system 34. These optical spectra reflect the optical densities of the crude oil feedstocks to light of different wavelengths. In at least some embodiments, the spectrometers 48 are near-infrared spectrometers that measure optical densities of the crude oil feedstocks in a near-infrared portion of the electromagnetic spectrum. Although the fluid analyzers 32 are shown to include online spectrometers 48 in FIG. 3, other forms of online analyzers may be provided in addition to or instead of spectrometers 48 in other embodiments.

Further, in at least some instances, the online analyzers (whether provided as spectrometers 48 or in some other form) facilitate measurement of discrete or complex parameters with sufficiently high accuracy and response time to enable the blending process to meet the desired accuracy for the final blended product. By way of example, total boiling point curves can be calculated (e.g., by the controller 36) from the online analyzers (e.g., from optical spectra measured with the spectrometers 48). As discussed further below, the total boiling point curves of the crude oil feedstocks can be used to implement feed-forward control of the blending process in the apparatus 10. The other sensors 50 in FIG. 3 can include any suitable sensors or other devices for analyzing crude oil feedstocks used during blending. For instance, in one embodiment the other sensors 50 include temperature and pressure sensors, and measurements from these sensors are used to provide temperature and pressure compensation in calculating the blend recipe.

In at least some embodiments, the apparatus 10 is an in-line blending system in which multiple crude oil feedstocks are simultaneously fed into a single line (e.g., a blend header 54 of the mixing system 34) in a metered fashion and in desired proportions according to the crude oil blend to be produced. Although the individual crude oil feedstock streams meet in the blend header 54, the system 34 can also include a mixer 56 in the blend header 54 for commingling the individual components of the blended crude oil. The mixer 56 can be provided in any suitable manner. In some instances, the mixer 56 includes a pumped bypass loop from the blend header 54, in which a portion of the blended crude oil is taken from the blend header 54 and then returned as fluid jets into the blend header 54 upstream from the take-off point. The fluid jets mix the components of the blended crude oil to increase its homogeneity for more accurate analysis. In at least one embodiment, the mixer 56 ensures that, at even the worst anticipated design conditions of the blend ratio, flow rate, and operating conditions (e.g., pressure), the mixer 56 will add sufficient shear mixing energy to provide even mixing of the blended crude oil and minimize any thermal gradients that could negatively affect conditions (e.g., formation of wax).

Figure 4:
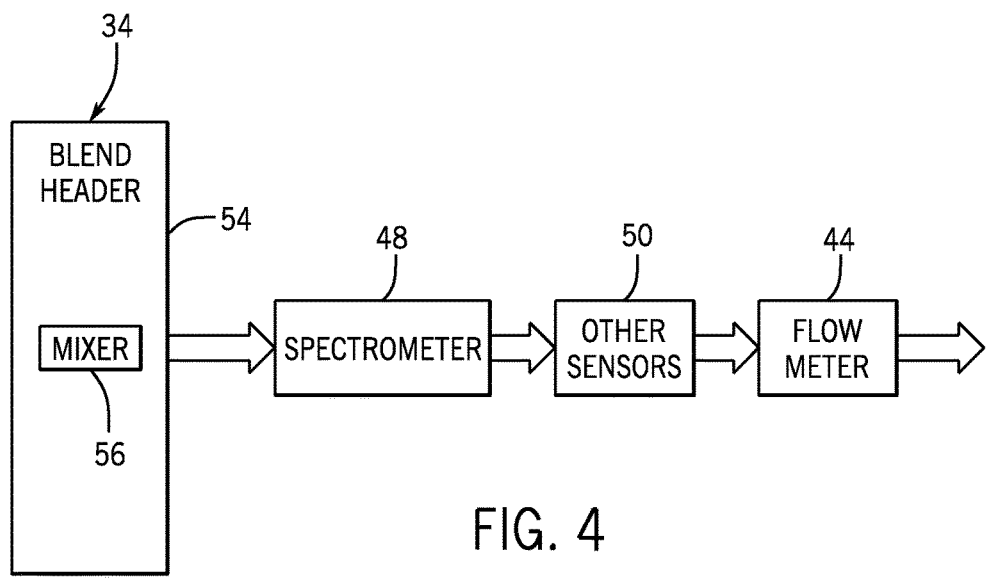
FIG. 4 is a block diagram representing components for analyzing the blended crude oil downstream from the blend header in accordance with one embodiment.

After the individual crude oil feedstocks are combined, properties of the blended crude oil can be analyzed downstream from the mixer 56. For example, as shown in FIG. 4, a flow meter 44 can be used to measure the flow rate of the blended crude oil (e.g., as it flows to the tank 24), and a spectrometer 48 and other sensors 50 can be provided to determine fluid properties of the blended crude oil. The spectrometer 48 and other sensors 50 for analyzing the blended crude oil may be similar or identical to those described above for analyzing the individual crude oil feedstocks. And as also noted above, some other form of online analyzer could be used in addition to, or in place of the spectrometer 48.

In at least some embodiments, the measurements from these devices for the blended crude oil are used for feedback on the blending process. More specifically, the optical spectrum of the blended crude oil can be measured by the spectrometer 48 of FIG. 4 and used to determine an actual total boiling point curve for the blended crude oil. In other embodiments, a different online analyzer may be used to determine the actual total boiling point curve. Regardless of how determined, this actual total boiling point curve can be compared with the target total boiling point curve for the blended crude oil. The apparatus 10 can include closed-loop (feedback) control to vary the blend recipe based on the comparison of the target and actual total boiling point curves.

Figure 5:
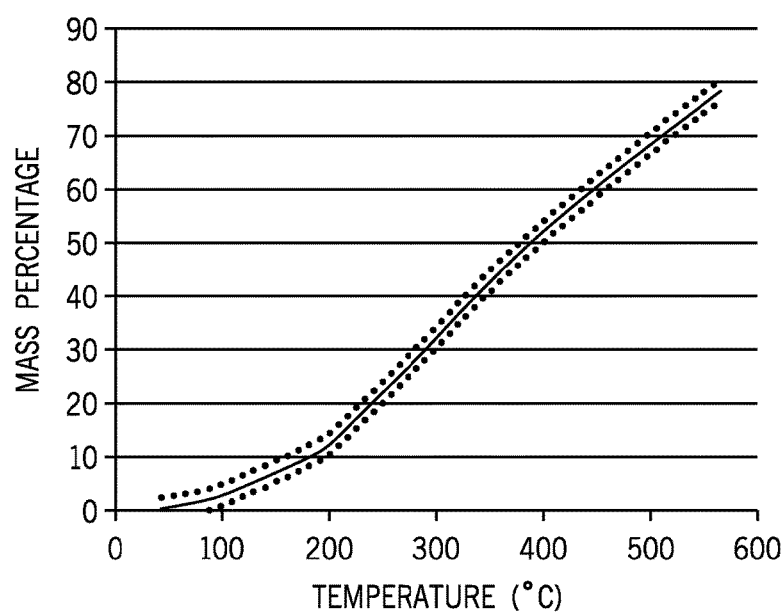
FIG. 5 is a graph of a target total boiling point curve for a blended crude oil in accordance with one embodiment.

As noted above, certain embodiments of the present disclosure include a technique for blending individual crude oil feedstocks into a blended crude oil according to a total boiling point curve for the blended crude oil. One example of such a total boiling point curve is depicted in FIG. 5. The total boiling point curve represents the portion of the analyzed crude oil (here shown as a percentage by mass) that would vaporize in response to the oil being heated to a given temperature. For example, for a crude oil with the total boiling point curve of FIG. 5, less than five percent of the fluid (by mass) would vaporize if heated to 100° C., between thirty and thirty-five percent would vaporize if heated to 300° C., and almost seventy percent would vaporize if heated to 500° C.

As the different cuts of fluid taken from a distillation unit depend on their boiling points, the total boiling point curve is indicative of the yield of the crude oil. A target total boiling point curve can be calculated based on cut constraints, which are generally depicted as points above and below the curve in FIG. 5. That is, upper and lower mass percentage constraints can be provided at different temperatures and the target total boiling point curve can be calculated (and adjusted as needed) to comply with such constraints. As used herein, determining a total boiling point curve can be performed by determining discrete points (e.g., mass percentage of vaporization at various temperatures) representative of such a curve, and does not require that a curve be actually fit to the discrete points. Similarly, blending of individual crude oil streams according to a target total boiling point curve for the crude oil blend can be performed by blending the individual crude oil streams according to discrete points, or ranges of such points (which can be embodied by target constraints, such as those shown in FIG. 5), representative of the target total boiling point curve.

Figure 6:
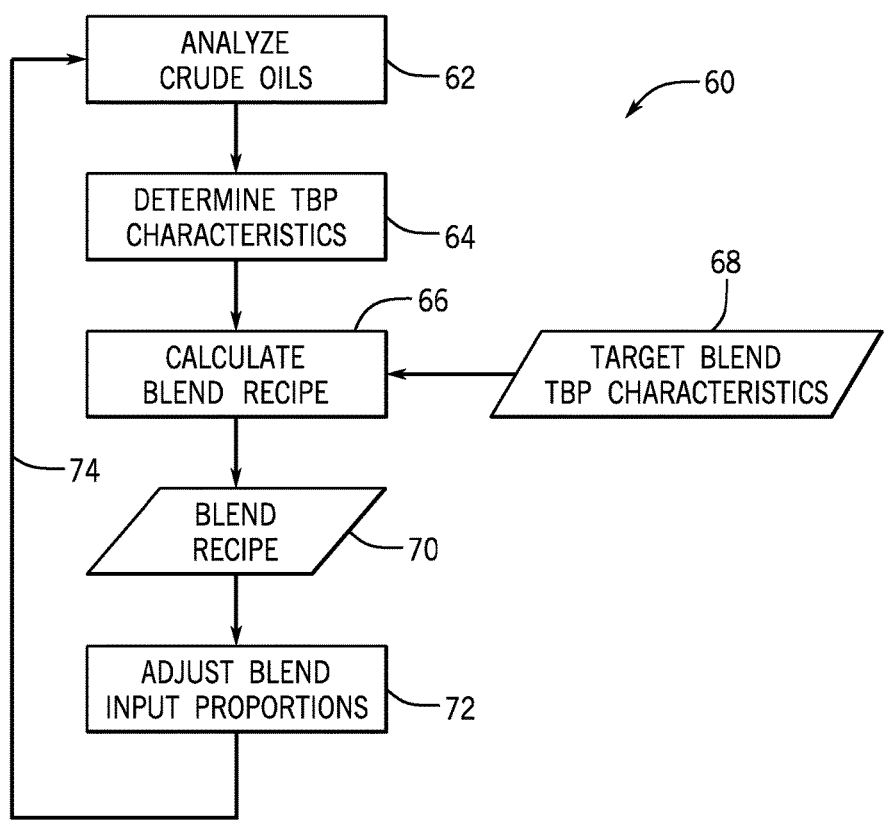
FIG. 6 is a flowchart representing a blending process in which measured and target total boiling point curves are compared to vary a blend recipe during the blending process in accordance with one embodiment.

Measurements of flowing crude oil in the apparatus 10 during blending can be used to determine total boiling point characteristics of the crude oil, and these determined characteristics can be used to dynamically control the ratio of feedstocks combined to produce a blended crude oil during the blending process. By way of example, the flowchart 60 of FIG. 6 generally represents a process for controlling crude oil blending. In this process, crude oils in the apparatus 10 are analyzed (block 62) to determine total boiling point (TBP) characteristics (block 64). As noted above, the spectrometers 48 can be used to measure optical spectra of the crude oils; these optical spectra can be interpreted by the controller 36 to determine total boiling point characteristics (e.g., total boiling point curves) of the crude oils. In some embodiments, other online analyzers (besides spectrometers 48) can be used to determine the total boiling point characteristics.

The determined total boiling point characteristics are then used in calculating an adjusted blend recipe (block 66) based on a comparison of the determined total boiling point characteristics with the target total boiling point characteristics 68 for the blended crude oil. The calculated blend recipe 70 is used to adjust the input proportions of the crude oil feedstocks into the blended crude oil (block 72), such as by adjusting one or more of the control valves 42 or the pumping speed of one or more variable-speed pumps 18 to change the relative proportions of the feedstocks flowing into the blend header 54. This change can be implemented immediately following calculation of the blend recipe or after a desired amount of time (e.g., a line-fill delay) has elapsed. Mixing of the crude oil feedstocks into the blended crude oil may then continue according to the adjusted blend recipe. In at least some embodiments, the analysis of crude oil for total boiling point characteristics, the calculating of the blend recipe, and the adjustment of the blend input proportions are repeated (e.g., continually or continuously) during the blending process, as generally represented by iterative loop 74 in FIG. 6.

In some embodiments, the analyzed crude oils for which total boiling point characteristics are determined are the crude oil feedstock streams (e.g., in input fluid lines 58) as they are pumped into the fluid mixing system 34 for combination into a crude oil blend. From this analysis, actual total boiling point curves are determined for the individual crude oil feedstocks. The blending process can use feedforward control to calculate an updated blend recipe based on the total boiling point curves for the individual crude oil feedstocks and the target total boiling point curve for the blended crude oil, such as by recalculating the blend recipe based on the individual total boiling point curves to produce a crude oil blend according to the target total boiling point curve.

The blending of crude oil feedstocks may also or instead use closed-loop control based on analysis of the blended crude oil. For instance, in one embodiment the blended crude oil is analyzed downstream from the blend header 54, such as with the spectrometer 48 of FIG. 4 or a different online analyzer, and an actual total boiling point curve is determined for the blended crude oil. This actual total boiling point curve can be compared to the target boiling point curve to calculate adjustments to the blend recipe and to validate performance of the blending system. Whether using feed-forward control, closed-loop control, or both, characteristics of the analyzed crude oil can be used to dynamically optimize the blend recipe in real time during mixing of the individual crude oil streams into the crude oil blend based on a determined characteristic of the analyzed crude oil and the target total boiling point curve for the crude oil blend.

Figure 7:
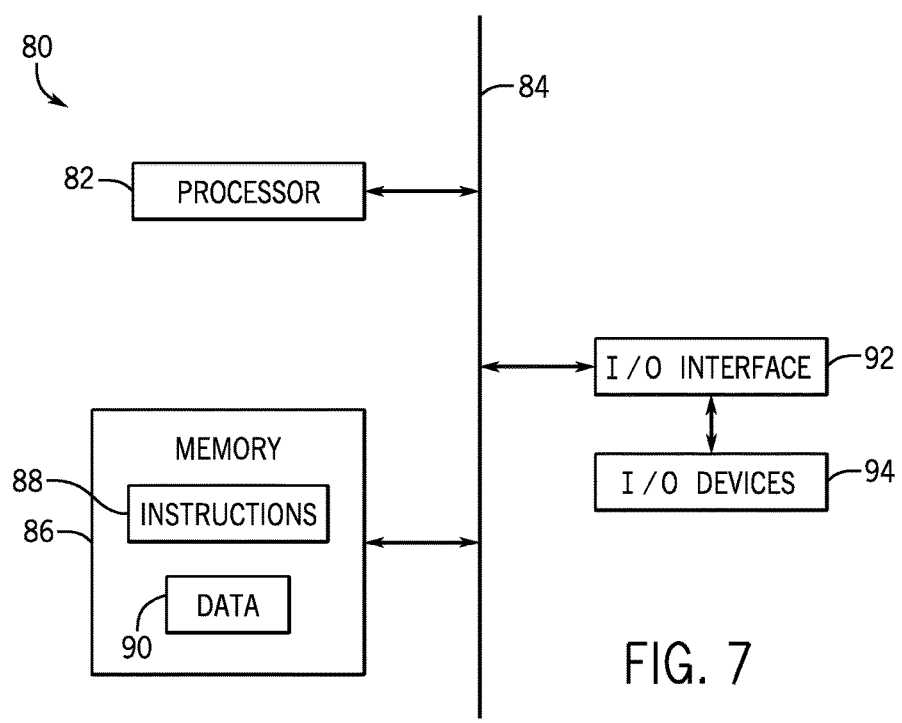
FIG. 7 is a block diagram of a programmable control system that can be used to control a blending process according to a target total boiling point curve in accordance with one embodiment.

Finally, it is noted that the control system 20 for implementing various functionality described above can be provided in any suitable form. In at least some embodiments, the control system 20 (or a controller 36 of the system 20) is provided in the form of a processor-based system, an example of which is provided in FIG. 7 and generally denoted by reference numeral 80. In this depicted embodiment, the system 80 includes a processor 82 connected by a bus 84 to a memory device 86. It will be appreciated that the system 80 could also include multiple processors or memory devices, and that such memory devices can include volatile memory (e.g., random-access memory) or non-volatile memory (e.g., flash memory and a read-only memory).

The one or more memory devices 86 are encoded with application instructions 88 (e.g., software executable by the processor 82 to perform various functionality described above), as well as with data 90 (e.g., look-up tables associating optical densities with total boiling point data for analyzed fluids). For example, the application instructions 88 can be executed to update a blend recipe based on a target total boiling point curve for a blended crude oil and actual total boiling point curves determined through measurement of crude oil during the blending process. In one embodiment, the application instructions 88 are stored in a read-only memory and the data 90 is stored in a writeable non-volatile memory (e.g., a flash memory).

The system 80 also includes an interface 92 that enables communication between the processor 82 and various input or output devices 94. The interface 92 can include any suitable device that enables such communication, such as a modem or a serial port. The input and output devices 94 can include any number of suitable devices. For example, in one embodiment the devices 94 include the flow meters 44, the spectrometers 48 (or other online analyzers), and the other sensors 50 for providing input of data to be used by the system 80, as well as the control valves 42 and pumps 18 that can be operated by the system 80 to control flow rates of individual crude oil feedstocks to be mixed into the blended crude oil. The devices 94 can also include a keyboard, buttons, or a touchscreen to allow user-input to the system 80, and a display or printer to output information from the system 80 to a user.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method comprising:
   pumping individual crude oil streams into a blending system;
   mixing the individual crude oil streams into a crude oil blend in the blending system according to a blend recipe;
   adjusting the blend recipe during mixing of the individual crude oil streams according to a target total boiling point curve for the crude oil blend; and
   continuing to mix the individual crude oil streams into the crude oil blend in the blending system according to the adjusted blend recipe.

2. The method of claim 1, comprising determining a characteristic of the individual crude oil streams while pumping the individual crude oil streams into the blending system.

3. The method of claim 2, wherein determining the characteristic of the individual crude oil streams includes determining a total boiling point curve for each of the individual crude oil streams.

4. The method of claim 3, wherein adjusting the blend recipe includes using feed-forward control to calculate an updated blend recipe based on the determined total boiling point curves for the individual crude oil streams.

5. The method of claim 3, wherein determining the total boiling point curve for each of the individual crude oil streams includes obtaining optical spectra for the individual crude oil streams and determining the total boiling point curves for each of the individual crude oil streams from the optical spectra.

6. The method of claim 1, comprising:
   analyzing the crude oil blend; and
   determining an actual total boiling point curve for the crude oil blend.

7. The method of claim 6, comprising comparing the actual total boiling point curve for the crude oil blend to the target boiling point curve for the crude oil blend.

8. The method of claim 7, wherein adjusting the blend recipe includes adjusting the blend recipe based on the comparison of the actual and target boiling point curves for the crude oil blend.

9. The method of claim 1, comprising changing flow rates of the individual crude oil streams into the blending system according to the adjusted blend recipe.

10. The method of claim 1, comprising:
    determining a characteristic of the individual crude oil streams or of the crude oil blend; and
    dynamically optimizing the blend recipe in real time during mixing of the individual crude oil streams into the crude oil blend based on the target total boiling point curve and on the determined characteristic of the individual crude oil streams or of the crude oil blend.

11. The method of claim 10, wherein determining the characteristic of the individual crude oil streams or of the crude oil blend includes determining an actual total boiling point curve for each of the individual crude oil streams or for the crude oil blend.

12. A method comprising:
    measuring a property for each of a plurality of crude oil feedstocks;

determining a total boiling point curve for each of the plurality of crude oil feedstocks based on the measured property;

calculating a blend recipe of the crude oil feedstocks based on the determined total boiling point curves for the plurality of crude oil feedstocks and a target boiling point curve for a blended crude oil; and producing the blended crude oil from the plurality of crude oil feedstocks, wherein producing the blended crude oil includes controlling input flow rates of the plurality of crude oil feedstocks into a blending system according to the calculated blend recipe that is based on the determined total boiling point curves for the plurality of crude oil feedstocks and the target boiling point curve for the blended crude oil.

13. The method of claim 12, comprising determining an actual total boiling point curve for the blended crude oil.

14. The method of claim 13, wherein calculating the blend recipe includes using both feed-forward control to adjust the blend recipe in real time based on the determined total boiling point curve for each of the plurality of crude oil feedstocks and closed-loop control to adjust the blend recipe in real time based on the determined actual total boiling point curve for the blended crude oil.

15. The method of claim 12, wherein:
measuring the property for each of the plurality of crude oil feedstocks includes measuring an optical spectrum for each of the plurality of crude oil feedstocks; and determining the total boiling point curve for each of the plurality of crude oil feedstocks based on the measured property includes determining the total boiling point curve for each of the plurality of crude oil feedstocks based on the optical spectrum.

16. The method of claim 15, comprising validating performance of the blending system via analysis of the blended crude oil output from the blending system.

* * * * *